(12) United States Patent
Zhang et al.

(10) Patent No.: US 12,262,436 B2
(45) Date of Patent: Mar. 25, 2025

(54) DUAL CONNECTIVITY AND CARRIER AGGREGATION ENHANCEMENT SCHEMES IN WIRELESS COMMUNICATION

(71) Applicant: ZTE Corporation, Guangdong (CN)

(72) Inventors: Mengjie Zhang, Shenzhen (CN); He Huang, Shenzhen (CN); Jianxun Ai, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 326 days.

(21) Appl. No.: 17/707,386

(22) Filed: Mar. 29, 2022

(65) Prior Publication Data

US 2022/0225461 A1 Jul. 14, 2022

Related U.S. Application Data

(63) Continuation of application No. PCT/CN2019/109489, filed on Sep. 30, 2019.

(51) Int. Cl.
| | |
|---|---|
| *H04W 76/19* | (2018.01) |
| *H04W 76/15* | (2018.01) |
| *H04W 76/18* | (2018.01) |
| *H04W 76/20* | (2018.01) |
| *H04W 76/27* | (2018.01) |

(52) U.S. Cl.
CPC ............ *H04W 76/19* (2018.02); *H04W 76/15* (2018.02); *H04W 76/20* (2018.02)

(58) Field of Classification Search
None
See application file for complete search history.

(56) References Cited

U.S. PATENT DOCUMENTS

| 11,219,082 B2 | 1/2022 | Zhang et al. | |
|---|---|---|---|
| 2015/0223106 A1* | 8/2015 | Van Phan | H04W 72/27 370/225 |

(Continued)

FOREIGN PATENT DOCUMENTS

| CN | 104219787 A | 12/2014 |
|---|---|---|
| CN | 108924866 A | 11/2018 |
| WO | WO 2018/171577 A1 | 9/2018 |
| WO | WO 2018/203710 A1 | 11/2018 |

OTHER PUBLICATIONS

Qualcomm, "Reply LS on UE behaviour for dormant SCell without PCell UL synchronization", 3GPP TSG RAN WG2 Meeting #105, R2-1900784, Mar. 1, 2019, 1p, GR.

(Continued)

*Primary Examiner* — Sai Aung
(74) *Attorney, Agent, or Firm* — Crowell & Moring LLP (57) ABSTRACT

Methods, systems, and devices for dual connectivity and carrier aggregation enhancement schemes in wireless communication are described. In one aspect, a wireless communication method is provided, which includes receiving by a user device, from a network device, an indication indicating i) whether a recovery operation for a first cell group failure is allowed and selectively indicating ii) an available transmission path for the recovery operation; upon a detection of the first cell group failure, determining a transmission path for transmitting failure information based on the received indication; and transmitting the failure information based on the determining.

20 Claims, 6 Drawing Sheets

(56) References Cited

U.S. PATENT DOCUMENTS

| | | | | |
|---|---|---|---|---|
| 2015/0350976 | A1* | 12/2015 | Kodali | H04W 76/28 |
| | | | | 455/440 |
| 2018/0376383 | A1* | 12/2018 | Belghoul | H04W 36/28 |
| 2020/0021372 | A1* | 1/2020 | Zhang | H04B 17/327 |
| 2020/0029383 | A1* | 1/2020 | Venugopal | H04W 76/19 |
| 2020/0260347 | A1* | 8/2020 | Xu | H04W 88/06 |
| 2021/0112617 | A1 | 4/2021 | Zhang et al. | |
| 2021/0336688 | A1* | 10/2021 | Lee | H04W 4/40 |

OTHER PUBLICATIONS

OPPO, "Fast MCG recovery for MR-DC enhancement", 3GPP TSG-RAN2 Meeting #106, R2-1905590, Apr. 17, 2019, US.
ZTE Corporation et al., "MCG fast recovery via SCG", 3GPP TSG-RAN WG2 Meeting #106, R2-1907103, May 17,2019, US.
Extended European Search Report for application No. EP 19947695.3 dated Aug. 24, 2022, 12p.
English language translation of the First Office Action and Search Report for corresponding Chinese application No. 201980100147.9 dated Apr. 28, 2023, 5p.
First Office Action with Search Report for corresponding Chinese application No. 201980100147.9 dated Apr. 28, 2023, 12p.
International Search Report for priority application PCT/CN2019/109489 dated Jul. 1, 2020, 3p, in English language.
Media Tek Inc., "Discussion on fast recovery," 3GPP TSG-RAN WG2 #107 R2-1909139, Aug. 29-30, 2009, 3p, Czech Republic.
NEC, "Initiation of fast MCG recovery,"3GPP TSG-RAN WG2—#107 R2-1909146, Aug. 15, 2009, 3p, Czech Republic.
Written Opinion for priority application No. PCT/CN2019/109489 dated Jul. 1, 2020, 5p, in English language.

* cited by examiner

DUAL CONNECTIVITY AND CARRIER AGGREGATION ENHANCEMENT SCHEMES IN WIRELESS COMMUNICATION

RELATED APPLICATION

This application is a continuation of International Application No. PCT/CN2019/109489, filed Sep. 30, 2019 and entitled, "DUAL CONNECTIVITY AND CARRIER AGGREGATION ENHANCEMENT SCHEMES IN WIRELESS COMMUNICATION," which is incorporated herein by reference in its entirety.

TECHNICAL FIELD

This patent document generally relates to systems, devices, and techniques for wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to provide support for an increased number of users and devices.

SUMMARY

This document relates to methods, systems, and devices for dual connectivity and carrier aggregation enhancement schemes in wireless communications.

In one aspect, a wireless communication method is disclosed. The method includes receiving by a user device, from a network device, an indication indicating i) whether a recovery operation for a first cell group failure is allowed and selectively indicating ii) an available transmission path for the recovery operation; upon a detection of the first cell group failure, determining a transmission path for transmitting failure information based on the received indication; and transmitting the failure information based on the determining.

In another aspect, a wireless communication method is disclosed. The method includes identifying, by a user device, a dormant resource configured by a network device, including a dormant downlink resource providing less frequent downlink channel occasion as compared to a non-dormant downlink resource and a dormant uplink resource having less uplink resource as compared to a non-dormant uplink resource; and providing, by the network device, a link between the dormant downlink resource and a dormant uplink resource.

In another aspect, a wireless communication method is disclosed. The method includes receiving, at a master node, from a secondary node, transmission path information supported by the secondary node for a recovery operation that is performed upon an occurrence of a first cell group failure, the transmission path used to transmit failure information associated with the first cell group failure; determining, at the master node, i) whether the recovery operation is allowed and ii) which transmission path is applied for a user device; and transmitting, by the master node, to the user device, an indicator indicating a result of the determination.

In another aspect, a wireless communication apparatus comprising a processor configured to perform the disclosed methods is disclosed.

In another aspect, a computer readable medium having code stored thereon is disclosed. The code, when implemented by a processor, causes the processor to implement a method described in the present document.

The above and other aspects and their implementations are described in greater detail in the drawings, the descriptions, and the claims.

DETAILED DESCRIPTION

The disclosed technology provides implementations and examples of dual connectivity and carrier aggregation enhancement schemes in wireless communications. In some implementations, the recovery techniques are performed in a situation of a master cell group (MCG) failure including MCG failure in case of DC or PCell failure in case of CA. In some implementations, the recovery techniques proposed in this document provide using an indicator providing information whether a recovery operation is allowed and if the recovery operation is allowed, which transmission path is available for transmitting link failure information. The disclosed technology allows to reduce recovery time need for the recovery operation. In some implementations, the disclosed technology provides implementation and examples of power saving that are performed by dormant BWP switching.

With a continuous increasing of global smartphone users, mobile data usage and traffic will continue to grow. In New Radio, Dual Connectivity (DC) are proposed to allow a wireless communication device with multiple transceivers to simultaneously receive data packet from at least two wireless communication nodes, for example a Master gNodeB (e.g., MgNB or MN) and a secondary gNodeB (e.g., SgNB or SN). The wireless communication device can connect with a Master Cell Group (MCG) associated with the MN and a Secondary Cell Group (SCG) associated with the SN simultaneously so as to improve data rate, reduce latency, and improve reliability. In addition to DC, carrier aggregation (CA) have been a key feature for boosting peak data rates in flexible manner for many different deployment scenarios. In this document, techniques for reducing recovery time upon a detection of a radio link failure are discussed. Some implementations of the disclosed technology employ DC and CA enhancements to reduce the recovery time needed for a recovery process that is performed upon the detection of the MCG or/and PCell failure. And some implementations of the disclosed technology employ DC and CA enhancements for power saving.

Figure 1:
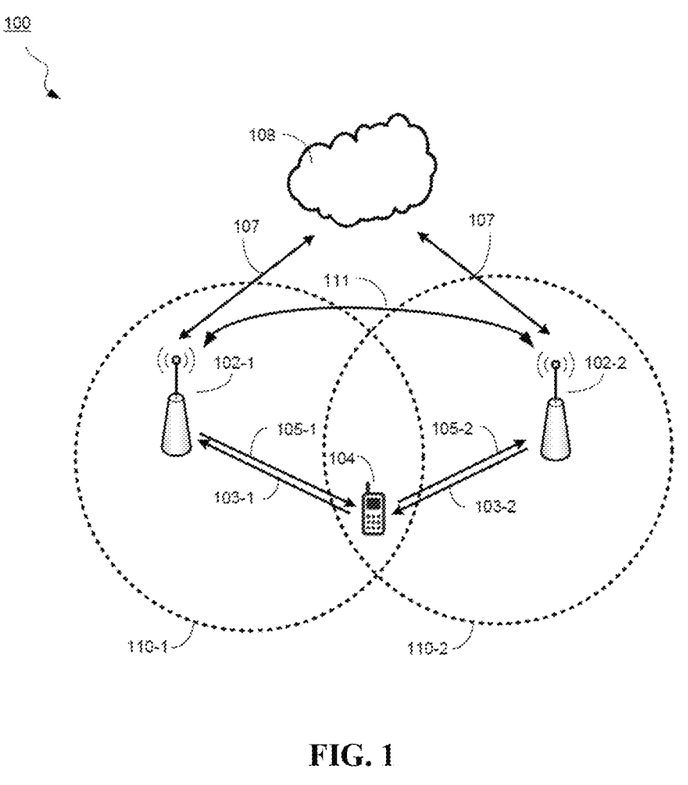
FIG. 1 shows an example of wireless communication including a base station (BS) and user equipment (UE) based on some implementations of the disclosed technology.

FIG. 1 shows an example of a wireless communication system (e.g., a 5G or NR cellular network). In a wireless communication system, a network side communication node or a base station (BS) 102-1 or 102-2 can be a node B, an E-UTRA Node B (also known as Evolved Node B, eNodeB or eNB), a gNodeB (also known as gNB) in new radio (NR) technology, a pico station, a femto station, or others. A terminal side communication device or a user equipment (UE) 104 can be a long-range communication system like a mobile phone, a smart phone, a personal digital assistant (PDA), tablet, laptop computer, or a short-range communication system such as, for example a wearable device, a vehicle with a vehicular communication system and others. A network communication node and a terminal side communication device are represented by a BS 102-1 or 102-2 and a UE 104, respectively, and in all the embodiments in this disclosure hereafter, and are generally referred to as "communication nodes" and "communication device" herein. Such communication nodes and communication devices may be capable of wireless and/or wired communications, in accordance with various embodiments of the invention. Accordingly, it is understood that the system may include any desired combination of BSs 102-1 and 102-2 and UEs 104.

Referring to FIG. 1, the wireless communication network 100 includes a first BS 102-1, a second BS 102-2, and a UE 104. In some embodiments, the UE 104 forms direct communication (i.e., uplink) channels 103-1 and 103-2 with the first BS 102-1 and the second BS 102-2, respectively. In some embodiments, the UE 104 also forms direct communication (i.e., downlink) channels 105-1 and 105-2 with the first BS 102-1 and the second BS 102-2, respectively. The direct communication channels between the UE 104 and the BS 102 can be through interfaces such as an Un interface, which is also known as E-UTRA/NR air interface. In some embodiments, the UE 104 comprises a plurality of transceivers which enables the UE 104 to support carrier aggregation (CA). In some embodiments, the UE 104 comprises a plurality of transceivers which enables the UE 104 to support dual connectivity so as to receive data simultaneously from the first BS 102-1 and the second BS 102-2. The first and second BS 102-1 and 102-2 each is connected to a core network (CN) 108 through an external interface 107, e.g., an Iu interface, or an NG interface. In some other embodiment, the first BS 102-1 (gNB) is a Master Node (MN), which is connected to the CN 108 and the second BS 102-2 (gNB) is a Secondary Node (SN), which is also connected to the CN 108.

In some other embodiments, when the first BS 102-1 and the second BS 102-2 each is a gNB, the direct communication between the first BS 102-1 and the second BS 102-2 is through an Xn interface. The first BS 102-1 and the second BS 102-2 are neighboring BSs. A first serving cell 110-1 is covered by the first BS 102-1 and the second serving cell 110-2 is covered by the second BS 102-2. In some embodiments, the first cell 110-1 is a primary cell of the MN, known as PCell, and the second cell 110-2 is a primary cell of the SN, known as PSCell. In some embodiments, the first cell 110-1 and the second cell 110-2 are neighboring cells, that includes a BS 120 and one or more user equipment (UE) 111, 112 and 113. In some embodiments, the UEs access the BS (e.g., the network) using implementations of the disclosed technology (131, 132, 133), which then enables subsequent communication (141, 142, 143) from the BS to the UEs. The UE may be, for example, a smartphone, a tablet, a mobile computer, a machine to machine (M2M) device, an Internet of Things (IoT) device, and so on.

Figure 2:
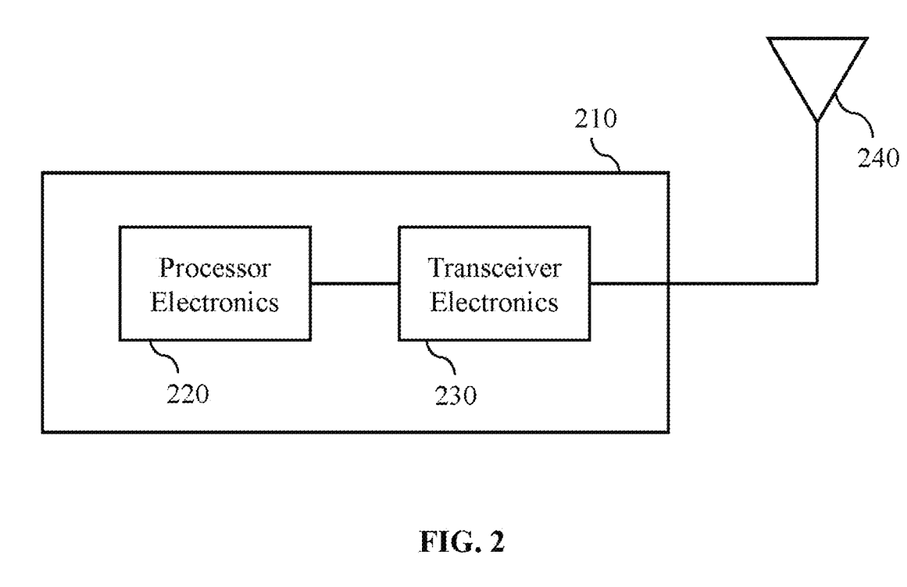
FIG. 2 shows an example of a block diagram of a portion of an apparatus based on some implementations of the disclosed technology.

FIG. 2 shows an example of a block diagram representation of a portion of an apparatus. An apparatus 210 such as a base station or a wireless device (or UE) can include processor electronics 220 such as a microprocessor that implements one or more of the techniques presented in this document. The apparatus 210 can include transceiver electronics 230 to send and/or receive wireless signals over one or more communication interfaces such as antenna 240. The apparatus 210 can include other communication interfaces for transmitting and receiving data. The apparatus 210 can include one or more memories (not explicitly shown) configured to store information such as data and/or instructions. In some implementations, the processor electronics 220 can include at least a portion of transceiver electronics 230. In some embodiments, at least some of the disclosed techniques, modules or functions are implemented using the apparatus 210.

In some implementations of the disclosed technology, a fast recovery process is promoted to reduce the recovery time needed for the recovery process. The fast recovery process proceeds upon a detection of a MCG/PCell failure occurring on a primary cell of a master cell group associated with the master node. A MCG/PCell failure occurs when one of the following conditions is met: i) upon detecting radio link failure of the MCG/PCell; ii) upon re-configuration with sync failure of the MCG/PCell; iii) upon mobility from NR failure; iv) upon integrity check failure indication from lower layers concerning SRB1 or SRB2; v) upon an RRC connection reconfiguration failure.

Figure 3:
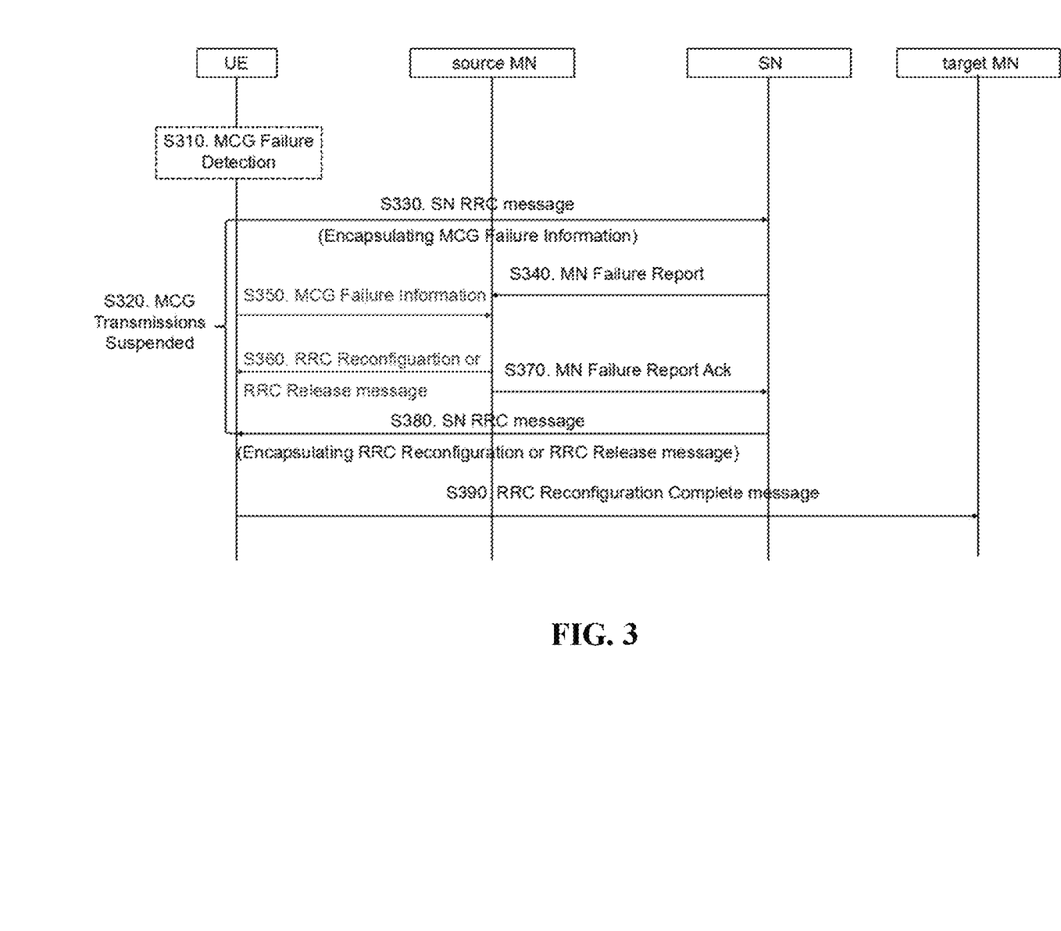
FIG. 3 shows an example process illustrating a recovery scheme based on some implementations of the disclosed technology.

FIG. 3 shows an example of a recovery process. The communication system in the illustrated embodiment comprises a source master node MN, a secondary node SN, a target master node MN, and a UE. In the illustrated embodiments, the UE is in one of at least one serving cell covered by the master node MN including the source MN and the target MN and the UE is also in one of at least one serving cell covered by the secondary node SN, i.e., the UE is in connection with the master node MN and the secondary node SN. In some embodiments, the master node MN is a primary wireless communication node and the secondary node SN is a secondary wireless communication node. In some embodiments, the master node MN and the secondary node SN are target nodes to which the UE transmits the failure information during a fast recovery procedure. At least one serving cell within a MN are grouped together to form a Master Cell Group (MCG), and the at least one serving cell within a SN are grouped together to form a Secondary Cell Group (SCG).

The fast recovery procedure in FIG. 3 starts at step 310 where the UE detects a MCG/PCell failure. Upon detecting the MCG/PCell failure, at step 320, the UE suspends MCG transmission for all SRBs (Signaling Radio Bears) and DRBs (Dedicated Radio Bearers). At step 330, the UE transmits the MCG failure information to the secondary node SN via SRB3. In some implementations, the MCG failure information message may be encapsulated in an SN RRC message (e.g. ULInformationTransferMRDC message). At step 340, the secondary node SN transmits the MN failure report to the source MN/PCell. The MN failure report transmitted from the secondary node SN to the master node MN may encapsulate the MCG failure information message. At step 350, the UE transmits the MCG failure information via SRB1 over MCG SCell or split SRB1 to the source MN/PCell. At step 360, the source MN/PCell transmits the MCG failure response to the UE. In some implementations, the MCG failure response is either a RRC reconfiguration message or a RRC release message. In some implementations, the MCG failure response is transmitted via SRB1 over MCG SCell or split SRB1. Thus, upon the reception of the MCG failure information, the source MN/PCell can send RRC reconfiguration message or RRC release message to the UE, using SRB1 over MCG SCell or split SRB1. At step 370, the source MN/PCell transmits the MN failure report ack in response to the MN failure report. In some implementations, the MN failure report ack may encapsulate either MN RRC reconfiguration or MN RRC release message. At step 380, the SN transmits an SN RRC message to the user device via SRB3. The SN RRC message (e.g. DLInformationTransferMRDC message) may encapsulate the MN RRC reconfiguration or MN RRC release message. Upon receiving an RRC reconfiguration message, the UE resumes MCG transmissions for all radio bearers. At step 390, the UE sends an RRC reconfiguration complete message to the target (or new) MN via SRB1. The sequential order in shown in FIG. 3 is an example only and the steps S310 to S390 can be performed in different sequential orders or just perform partial steps (e.g., only perform S310, S320, S330, S350, S360, S390 in case of recovery via split SRB1 or SRB1 over MCG SCell; or only perform S310, S320, S330, S340, S370, S380, S390 in case of recovery via SRB3).

Hereinafter, the detailed configuration and signaling for various implementations of the disclosed technology are described. Section headings are used in the present document only to facilitate ease of understanding and scope of the embodiments and techniques described in each section are not only limited to that section. Furthermore, while 5G terminology is used in some cases to facilitate understanding of the disclosed techniques, which may be applied to wireless systems and devices that use communication protocols other than 5G or 3GPP protocols.

Embodiment 1: MCG/PCell Fast Recovery Explicitly Configured by the NW

From the network perspective, the failure recovery scheme as suggested in some implementations of the disclosed technology has the following characteristics:

The secondary node SN transfers an indicator to the master node MN via X2/Xn signaling to indicate whether the split SRB1 based recovery or/and SRB3 based recovery can be allowed or can be supported by the secondary node SN. In some implementations, the indication can be identified by one IE in the inter-node RRC message or by one IE in X2/Xn message directly.

With the indication from the secondary node SN (e.g. whether the recovery process is allowed and which transmission path (or solution) is allowed in the secondary node SN), the master node MN is configured to determine whether MCG/PCell fast recovery is allowed, or/and which transmission path (e.g. MCG/PCell fast recovery via split SRB1 or SRB3 or SCell) can be applied to the UE. Based on the determination, the master node MN may send an indicator to the UE via the dedicated RRC signaling.

The indicator can be configured in various manners. In some implementations, one or more indicators can be used for the fast recovery scheme. In some implementations, one indicator is configured to indicate whether the fast recovery procedure is allowed. In some implementations, one indicator is configured to indicate whether the fast recovery procedure through SRB3 is allowed. In some implementations, one indicator is configured to indicate whether the fast recovery procedure through split SRB1 is allowed. In some implementations, one indicator is configured to indicate whether the fast recovery procedure through MCG SCell is allowed (e.g. through SRB1 over MCG SCell). The indicators can be configured as single IE or some of the indicators above can be merged to one IE (e.g. one IE to indicate the allowed method for MCG and/or PCell failure recovery).

From the UE perspective, the suggested failure recovery scheme has the following characteristics:

Before initiating the failure recovery operation, the UE receives an indicator from the network via the dedicated RRC message to indicate whether the fast recovery function is allowed. In some implementations, the indicator received at the UE from the network may further indicate which transmission path (or solution), e.g., split SRB1 or SRB3 or MCG SCell, is allowed for MCG and/or PCell fast recovery.

Once MCG/PCell failure is triggered, the UE checks whether the (split)SRB1 or SRB3 is allowed to send the MCG failure information and whether the (split)SRB1/SRB3 is available at this stage.

Once the path to delivery of the MCG failure information is determined, the UE processes the related operation accordingly. For example, the UE operates to suspend the PCell transmission or suspend the MCG transmission, deliver the link failure information to (split)SRB1 and/or SRB3, start a guard timer, etc.

Embodiment 2: UE Behavior when Both MCG/PCell Fast Recovery Via SCG and MCG SCell are Allowed and Supported The MCG/PCell fast recovery via MCG SCell can only be used when at least one condition or the combination of some of the conditions are satisfied. The examples of the conditions are as follows:

At least one SCell is configured with UL (Uplink) and DL (Downlink);

At least one SCell is configured with PUCCH (Physical Uplink Control Channel);

At least one SCell is configured with PUSCH (Physcial Uplink Shared Channel);

At least one SCell configured with at least one UL, PUSCH, or PUCCH is associated with a sTAG (secondary timing advance group);

CA (Carrier Aggregation) based PDCP (Packet Data Convergence Protocol) duplication is configured for SRB1;

SR (Scheduling Request) resource is configured on PUCCH over SCell;

There is no RLC (Radio Link Control) failure is detected related to the SCell.

If both MCG/PCell fast recovery via SCG and MCG SCell are allowed by the network and supported by the UE, upon detection of MCG/PCell failure, the UE may select the solution, e.g., the transmission path, based on the following rules:

Rule 1: The UE always prioritizes SCG based recovery process (i.e. reporting MCG/PCell failure information via split SRB1 or SRB3).

Rule 2: The UE always prioritizes SCell based recovery process (i.e. reporting MCG/PCell failure information via MCG SCell).

Rule 3: The UE selects the transmission path based on the indicator from the network. The indicator can be configured to be similar to the indication described in Embodiment 1, which is sent by the dedicated RRC signaling.

Rule 4: The UE processes both the SCell based recovery and SCG based recovery simultaneously. In some implementations, the RRC duplicates the MCG/PCell failure information and delivers it to both SRB1 over SCell and SRB3, or both the MCG leg of split SRB1 over SCell and the SCG leg of split SRB1. With the duplicated MCG failure information, the network can perform the following:

- Detect the duplication by using any kind of ID (e.g. transaction ID or some newly introduced ID) or sequence number included in the MCG failure information.
- Once the RRC reconfiguration message for MCG failure is delivered to a lower layer, the network may ignore the MCG failure information before the RRC reconfiguration complete message is received from the UE.

Once the UE selects one solution (e.g. SCG based or SCell based) to trigger the MCG/PCell fast recovery procedure, the UE operates to process the related operation accordingly. If the selected solution fails, the UE may be allowed to initiate the other solution to retry MCG/PCell failure recovery, instead of triggering RRC re-establishment procedure, unless MCG transmission for all SRBs and DRBs is suspended and/or MCG-MAC is reset.

The selected solution can be considered as failed in at least one of the following cases:

- The UE does not receive any response message, e.g., MCG/PCell failure recovery message that is either RRC Reconfiguration or RRC Release message, upon an expiry of a guard timer;
- There is an on-going SCG failure, if SCG based solution is selected;
- There is an on-going RLC failure on the MCG SCell, if SCell based solution is selected.

In some implementations, upon initiating the other solution (e.g., transmission path), the UE the UE processes the related operation accordingly (e.g. suspend the PCell transmission or suspend the MCG transmission, deliver the link failure information to (split)SRB1 or SRB3, etc.) and restart the guard timer. Upon the expiry of the timer, if the UE does not receive any response message, e.g. either RRC Reconfiguration or RRC Release message, the UE initiates RRC connection re-establishment procedure.

Embodiment 3: The UE Behaviour Upon Initiation of MCG/PCell Failure Recovery

Upon detection of MCG/PCell radio link failure (RLF), if the UE selects to initiate MCG/PCell failure recovery via SCell or/and SCG, the UE may perform at least one of the following actions:

Stop timer T310, if running;

Suspend PCell transmission for UL and DL;

Suspend the PUCCH and/or PUSCH transmission on PCell;

Suspend the PDCCH monitoring on PCell, except the PDCCH addressed to RA-RNTI, or suspend all the PDCCH monitoring on PCell;

Suspend all the MCG RLC bearers for both DRB and SRB2;

If a primary path is configured for SRB1, the primary path set to the logical channel only linked with PCell is implicitly reconfigured to the logical channel linked with SCell(s), when CA duplication is not configured for UL SRB1, or ignore the cell restrictions for the logical channel linked to the primary path;

Start the guard timer;

Transmit the MCG or/and PCell failure information;

Maintain the current measurement configurations from both the MN and the SN (if configured), and continue measurements based on configuration from the MN and the SN if possible.

In some implementations, the UE may perform the operations based on the selected solution. If the UE selects to initiate recovery operation via SCell, the UE may perform the operations as above mentioned. Otherwise, if the UE selects to initiate recovery operation via SCG, the UE may perform the operations according to the existing specification (e.g. suspend MCG transmission for all SRBs and DRBs; reset MCG-MAC; etc.)

Embodiment 4: Handling of RA and SR Transmission on PCell Upon Detection of MCG/PCell Failure In case MCG/PCell failure report via SCell is initiated but no UL grant is scheduled for any SCell, the UE may send RA (Random Access) or SR (Scheduling Request) to request UL resource.

For the RA, since the RA initiated by UE is only allowed on PCell, once PCell failure is detected, one issue is whether the RA procedure initiated by UE is allowed or not. In some implementations, the UE needs to trigger RRC reestablishment first, and process the RA on the selected cell (i.e. do the cell selection first and process the RA on the selected cell). In some implementations (e.g, the current release), in case that the maximum number of SR has been reached (i.e. SR_COUNTER=sr-TransMax), the UE will initiate RA on PCell. In some implementations, the RRC reestablishment may be triggered directly in case the PCell transmission is suspending; or RA on PCell is forbidden by a higher layer.

For the SR, if there is SR configured on PUCCH on SCell, the SR on PCell may be disabled, and the UE may select the SR configured on SCell.

Embodiment 5: Handling of Outstanding SRB1 PDCP Packets

In case split SRB1 is used, if there are UL or/and DL RRC messages sent via SRB1 pending when MCG/PCell failure recovery is triggered, the issue of PDCP re-ordering needs to be considered. For the UL, if the sequential delivery of RLC and/or PDCP packets is used in the network, it may not receive the MCG failure information since the PDCP reordering window may be pending due to waiting for the missing PDCP packets. For the DL, if the sequential delivery of RLC and/or PDCP packets are configured, the UE may not receive the MCG failure response message (either RRC Reconfiguration or RRC Release message) since the PDCP reordering window may be pended due to waiting for the missing PDCP packets. To solve the issue, the following solution can be considered:

From the network perspective, the solution includes the following characteristics:

For the DL, upon reception of MCG Failure Information message, the MN shall include an indicator in the RRC message to indicate whether the RRC reconfiguration is the response to the MCG failure recovery. If there is on-going RRC reconfiguration message without ACK, the master node MN will use full configuration in the RRC reconfiguration message for the MCG failure recovery.

From the UE perspective, the solution includes the following characteristics:

For the DL, the UE may operate as follows:
Once the MCG failure information is sent or once the MCG failure recovery procedure is initiated, the UE stop the PDCP reordering function for SRB1.
Once the MCG failure information is delivered, unless UE receive the RRC reconfiguration message linked to the MCG failure recovery, which is identified by one IE in the RRC reconfiguration message, the UE may ignore all the DL RRC message received on SRB1.
Once the RRC reconfiguration message linked to the MCG failure recovery is received, the UE performs the operation as configured in the RRC reconfiguration message.
The UE may start the PDCP reordering function in at least one of the following cases: i) The PDCP recovery is processed; ii) The PDCP re-establishment is processed; or iii) The RRC reconfiguration message linked to the MCG failure recovery is received.

For the UL, a special case the SCG RLC failure is triggered and an on-going MCG/PCell failure is detected needs to be considered. In Rel-15, if CA duplication is configured and activated on SCG, when the SCG RLC reaches the maximum number of retransmissions and the corresponding logical channel only linked with SCell(s), the UE may initiate the failure information procedure to report SCG RLC failure, instead of triggering RRC re-establishment procedure. Then the UE shall submit the FailureInformation message to the network via SRB1 or SRB3. If SRB3 is not configured, the UE may submit the FailureInformation message to the network via SRB1. However, an MCG failure may be detected after transmitting the FailureInformation message. In such case, the UE may initiate MCG fast recovery procedure to report the MCG failure information to the network via SCG and suspend the MCG transmission for all SRBs and DRBs. But the network may loss the FailureInformation message which is not delivered to the network successfully before the MCG transmission is suspended. So the network may be not aware of the RLC failure. In order to avoid the loss of FailureInformation message for RLC failure on the network, the UE can include some indication in the MCG failure information message. The indication may include at least one of the followings:
One indicator to indicate there is a SCG RLC failure occurred before the detection of MCG/PCell failure;
RLC failure information, e.g. cell group ID and logical-channel ID, failure type.

Upon receiving the MCG failure information message including SCG RLC failure indication, the master node MN may need to forward the indication to the SN via inter-node RRC message.

Embodiment 6: Dormant BWP

The dormant BWP is configured by the network for the UE powering saving. The dormant BWP includes the following characteristics:
A dormant uplink BWP is configured to be linked to a dormant downlink BWP.
The dormant downlink BWP is a downlink BWP which is configured with sparse or without PDCCH occasions. Thus, the dormant downlink BWP has a less frequent PDCCH occasion as compared to the downlink BWP which is not dormant. In some implementations, the dormant downlink BWP has a zero PDCCH occasion.
Optionally, the dormant uplink BWP is configured without configured grant.
Optionally, the dormant uplink BWP is configured without SRS configuration.
Optionally, the dormant uplink BWP is configured without PUSCH configuration.
Optionally, the dormant uplink BWP is configured without PUCCH configuration.
Optionally, the dormant uplink BWP is configured without PRACH (Physical Random Access Channel) configuration.

The dormant downlink BWP and the dormant uplink BWP may be linked by one of following methods:
The ID of the dormant downlink BWP is linked to the ID of the dormant uplink BWP for a serving cell via a RRC message or a MAC CE (MAC Control Element).
A RRC message may configure a dormant downlink BWP and a dormant uplink BWP for a serving cell.
The downlink BWP ID and an uplink BWP ID are indicated in a DCI (Downlink Control Information) which is used to switch between dormancy and non-dormancy behaviors for a serving cell.

Upon a BWP switching to a dormant downlink BWP, the UE switches the active uplink BWP to the dormant uplink BWP. The BWP switching to the dormant downlink BWP may be triggered by a DCI, or by a RRC reconfiguration message, or upon a timer expires. The DCI can be used to switch between dormancy behavior and non-dormancy behavior for a SCell. The dormancy behavior means that the SCell's active downlink BWP is the dormant downlink BWP and the SCell's active uplink BWP is the dormant uplink BWP. The timer can be used to facilitate the switching from the active BWP to the dormant BWP. For example, the switching from the active BWP to the dormant BWP can be performed when the timer expires. The dormant BWP means the dormant downlink BWP and the dormant uplink BWP. The RRC reconfiguration message may be used to configure the dormancy state for a SCell. Upon the reception of the RRC reconfiguration message, the UE may set the dormant BWP as the active BWP for the SCell.

For a serving cell configured with BWP (bandwidth part) inactivity timer, upon the BWP switching to a dormant BWP, the UE may stop the BWP inactivity timer if it is running. Or, when the BWP inactivity timer expires and the current active BWP is a dormant BWP, UE will not perform BWP switching to another BWP. By this solution, after the UE is instructed by the network to perform BWP switching to a dormant BWP, the UE will not perform the BWP switching to other BWPs due to BWP inactivity timer expiration. This can prevent the UE from switching from the dormant BWP, which is beneficial to power saving for the UE, to other BWPs (e.g., a default BWP) that are not as beneficial as the dormant BWP in terms of the power saving.

For a serving cell, the UE starts or restarts a second timer if the UE switches the active BWP to the default BWP if the default BWP is configured, or if the UE switches the active BWP to the initial BWP if the default BWP is not configured. Once the second timer expires, the UE performs the BWP switching to dormant BWP. The second timer is stopped when the UE performs the BWP switching to a BWP which is not default BWP if default BWP is configured, or when the UE performs the BWP switching to a BWP which is not the initial BWP if default BWP is not configured. The length of the second timer is configured by the network via the RRC message. By this solution, the network can control the BWP switching of the UE to the dormant BWP without explicit signaling, which results in the power saving for the UE.

Figure 4:
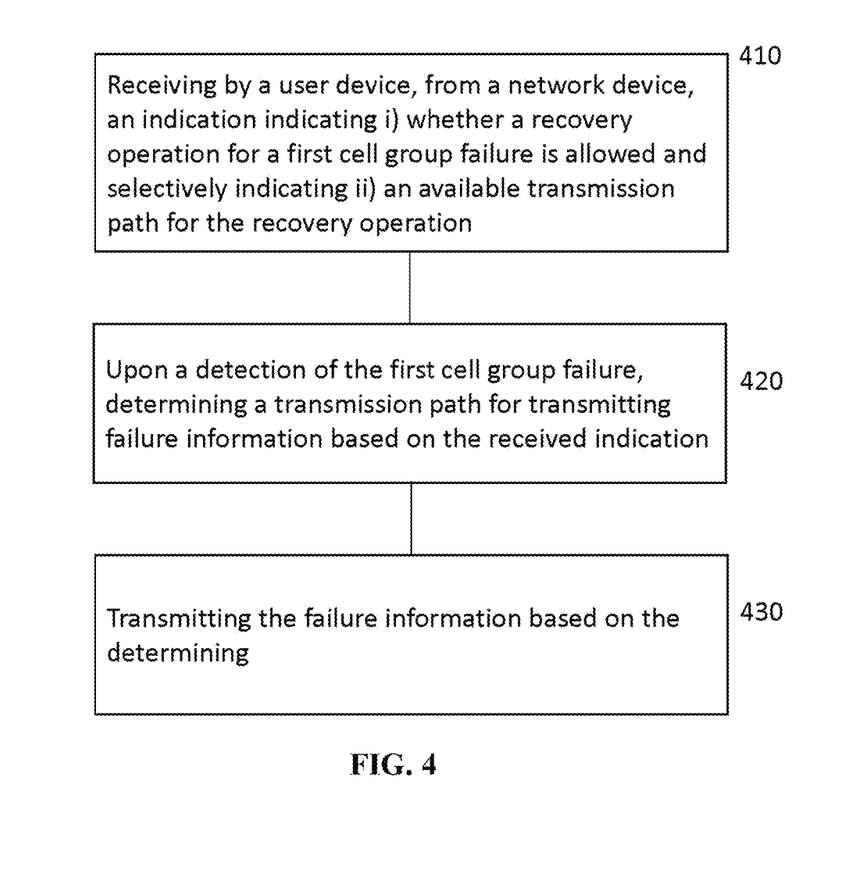
FIGS. 4-6 show examples of wireless communication schemes based on some implementations of the disclosed technology.

FIG. 4 shows an example of a wireless communication method based on some implementations of the disclosed technology. The method may include, at step 410, receiving by a user device, from a network device, an indication indicating i) whether a recovery operation for a first cell group failure is allowed and selectively indicating ii) an available transmission path for the recovery operation. The method may include, at step 420, upon a detection of the first cell group failure, determining a transmission path for transmitting failure information based on the received indication. The method may include, at step 430, transmitting the failure information based on the determining.

Figure 5:
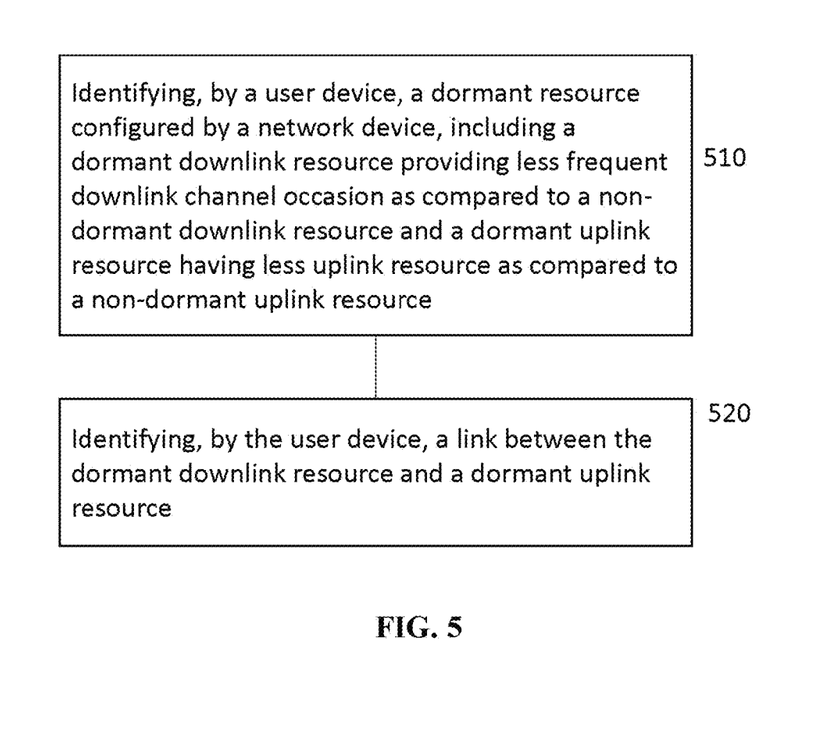

FIG. 5 shows an example of a wireless communication method based on some implementations of the disclosed technology. The method may include, at step 510, identifying, by a user device, a dormant resource configured by a network device, including a dormant downlink resource providing less frequent downlink channel occasion as compared to a non-dormant downlink resource and a dormant uplink resource having less uplink resource as compared to a non-dormant uplink resource. The method may include, at step 520, providing, by the network device, a link between the dormant downlink resource and a dormant uplink resource.

Figure 6:
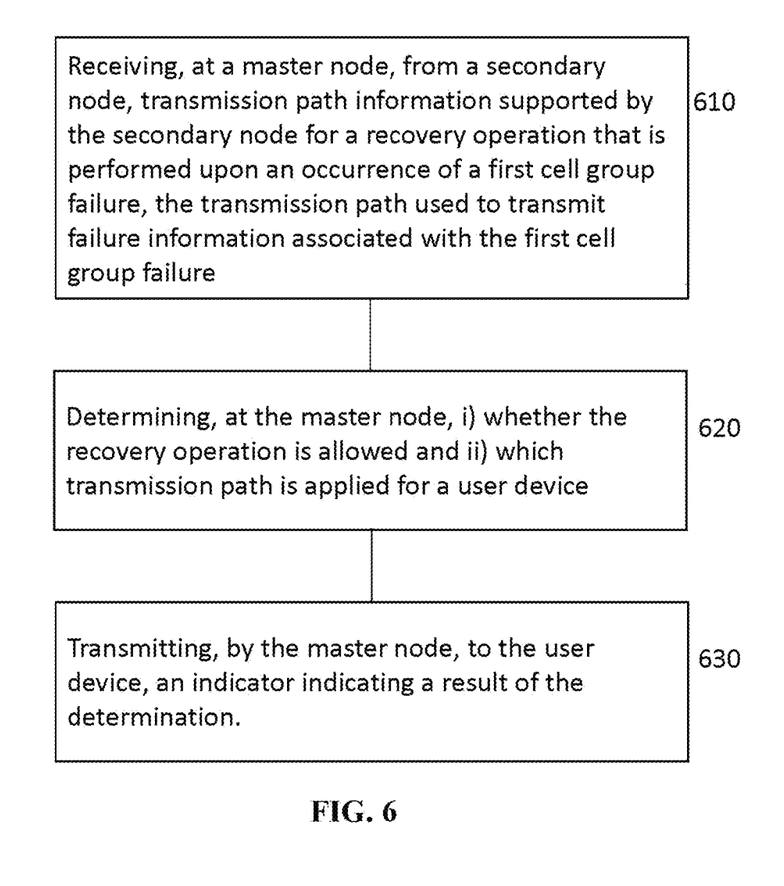

FIG. 6 shows an example of a wireless communication method based on some implementations of the disclosed technology. The method may include, at step 610, receiving, at a master node, from a secondary node, transmission path information supported by the secondary node for a recovery operation that is performed upon an occurrence of a first cell group failure, the transmission path used to transmit failure information associated with the first cell group failure. The method may include, at step 620, determining, at the master node, i) whether the recovery operation is allowed and ii) which transmission path is applied for a user device. The method may include, at step 630, transmitting, by the master node, to the user device, an indicator indicating a result of the determination Additional features and embodiments of the above-described methods/techniques are described below using a clause-based description format.

1. A wireless communication method, comprising: receiving by a user device, from a network device, an indication indicating i) whether a recovery operation for a first cell group failure is allowed and selectively indicating ii) an available transmission path for the recovery operation; upon a detection of the first cell group failure, determining a transmission path for transmitting failure information based on the received indication; and transmitting the failure information based on the determining. The network device may include the BS 102-1 or 102-2 as shown in FIG. 1 and the user device may include the UE 104 as shown in FIG. 1. In some implementations, the recovery operation may include operations discussed with Embodiments 1-5 as discussed above.

2. The wireless communication method of clause 1, wherein the indication is represented with an indicator indicating whether the recovery operation through a secondary cell in a first cell group is allowed.

3. The wireless communication of clause 1, wherein the indication is configured to indicate that both of a recovery operation via a second cell group and a recovery operation via a secondary cell in a first cell group are allowed.

4. The wireless communication method of clause 3, wherein the user device processes the recovery operation based on either the second cell group or the secondary cell in the first cell group.

5. The wireless communication method of clause 3, wherein the user device processes the recovery operation based on both of the second cell group and the secondary cell in the first cell group.

6. The wireless communication method of clause 3, further comprising: upon an expiry of a guard timer, transmitting the failure information based on another transmission path.

7. The wireless communication method of clause 3, wherein the determining of the transmission path determines the second cell group as the transmission path, and the method further comprises: upon occurrence of an on-going second cell group failure, transmitting the failure information based on the secondary cell in the first cell group.

8. The wireless communication method of clause 1, further comprising initiating the recovery operation via a secondary cell in a first cell group or via a second cell group.

9. The wireless communication method of clause 8, wherein the initiating of the recovery operation includes suspending a primary cell transmission for an uplink and a downlink.

10. The wireless communication method of clause 8, wherein the initiating of the recovery operation includes: reconfiguring, for a primary path configured for SRB1 (Signaling Radio Bearer 1) and set to a logical channel linked with a primary cell to a logical channel linked with a secondary cell, or ignoring a cell restriction for a logical channel linked to the primary path.

11. The wireless communication method of clause 8, further comprising sending a RA (Random Access) on a primary cell to request an uplink resource in case that no uplink grant is scheduled for a secondary cell in the first cell group and a maximum number of SR (Scheduling Request) has been reached.

12. The wireless communication method of clause 11, further comprising triggering a RRC reestablishment for a case that a primary cell transmission is suspending.

13. The wireless communication method of clause 1, further comprising, after the transmitting of the failure information, stopping a PDCP (Packet Data Convergence Protocol) recording function for SRB1.

14. The wireless communication method of clause 1, further comprising, after the transmitting of the failure information, ignoring downlink RRC message received on SRB1 until the user device receives a RRC reconfiguration message including an indicator to indicate whether a RRC reconfiguration is associated with the recovery operation.

15. The wireless communication method of clause 13, further comprising, starting a PDCP reordering function upon receiving a RRC reconfiguration message including an indicator to indicate whether a RRC reconfiguration is associated with the recovery operation.

16. The wireless communication method of clause 1, wherein the failure information includes an indicator to indicate a radio link control failure in a secondary cell group.

17. The wireless communication method of clause 1, further comprising: receiving an MN (Master Node) RRC reconfiguration message encapsulated in an SN (Secondary Node) RRC message; and sending an MN RRC reconfiguration complete message to a target MN via SRB1.

18. The wireless communication method of any of clauses 3-5, 7, and 8, wherein the first cell group is a group of cells associated with a master node and the second cell group is a group of cells associated with a secondary node.

19. A wireless communication method, comprising: identifying, by a user device, a dormant resource configured by a network device, including a dormant downlink resource providing less frequent downlink channel occasion as compared to a non-dormant downlink resource and a dormant uplink resource having less uplink resource as compared to a non-dormant uplink resource; and identifying, by the user device, a link between the dormant downlink resource and a dormant uplink resource. The network device may include the BS 102-1 or 102-2 as shown in FIG. 1 and the user device may include the UE 104 as shown in FIG. 1. In some implementations, the dormant resource related operation may include operations discussed with Embodiment 6 as discussed above.

20. The wireless communication method of clause 19, wherein an ID of the dormant downlink resource is linked to an ID of the dormant uplink resource for a serving cell via a RRC message.

21. The wireless communication method of clause 19, wherein the dormant resource, the dormant downlink resource and the dormant uplink resource correspond to a dormant BWP (bandwidth part), the dormant downlink BWP and the dormant uplink BWP, respectively.

22. The wireless communication method of clause 21, further comprising: stopping a BWP inactivity timer upon an active bandwidth part (BWP) switching to the dormant BWP.

23. The wireless communication method of clause 21, further comprising: starting a second timer, upon switching an active BWP to a default BWP if the default BWP is configured, or to an initial BWP if the default BWP is not configured.

24. The wireless communication method of clause 23, further comprising: performing a BWP switching to the dormant BWP, upon an expiry of the second timer.

25. The wireless communication method of clause 23, further comprising: stopping the second timer, upon performing a BWP switching to another BWP which is not the default BWP when the default BWP is configured, or another BWP that is not the initial BWP if the default BWP is not configured.

27. A wireless communication method, comprising: receiving, at a master node, from a secondary node, transmission path information supported by the secondary node for a recovery operation that is performed upon an occurrence of a first cell group failure, the transmission path used to transmit failure information associated with the first cell group failure; determining, at the master node, i) whether the recovery operation is allowed and ii) which transmission path is applied for a user device; and transmitting, by the master node, to the user device, an indicator indicating a result of the determination. The network device may include the BS 102-1 or 102-2 as shown in FIG. 1 and the user device may include the UE 104 as shown in FIG. 1. In some implementations, the recovery operation may include operations discussed with Embodiments 1-5 as discussed above.

28. The wireless communication method of clause 27, wherein the indicator is configured to indicate whether the recovery operation through a secondary cell in a first cell group is allowed.

29. The wireless communication of clause 27, wherein the indicator is configured to indicate that both of a recovery operation via a second cell group and a recovery operation via a secondary cell in a first cell group are allowed.

30. The wireless communication method of clause 29, wherein the first cell group failure information is duplicated as two RRC messages and the method further comprises detecting a duplication of the failure information through a transaction identification (ID) included in the RRC message.

31. The wireless communication method of clause 29, wherein the first cell group failure information is duplicated as two RRC messages and the method further comprises ignoring the failure information that is received after a response RRC message corresponding to the failure information is delivered to a lower layer.

32. The wireless communication method of clause 27, further comprising: upon a reception of the first cell group failure information, configuring a RRC message to include an indicator indicating whether a RRC reconfiguration is associated with the recovery operation.

33. The wireless communication method of clause 28 or 32, wherein the first cell group is a group of cells associated with the master node and the second cell group is a group of cells associated with the secondary node.

34. A communication apparatus comprising a processor configured to implement a method recited in any one or more of claims 1 to 33.

35. A computer readable medium having code stored thereon, the code, when executed, causing a processor to implement a method recited in any one or more of claims 1 to 33.

It is intended that the specification, together with the drawings, be considered exemplary only, where exemplary means an example and, unless otherwise stated, does not imply an ideal or a preferred embodiment. As used herein, the use of "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method, comprising:
    receiving, by a user device, from a network device, an indication indicating:
        that both of a first recovery operation via a second cell group and a second recovery operation via a secondary cell in a first cell group are allowed for a first cell group failure, and
        available transmission paths for the first recovery operation and the second recovery operation;
    upon a detection of the first cell group failure, determining a first transmission path for transmitting failure information based on the indication;
    transmitting the failure information based on the determining of the first transmission path;
    starting a guard timer; and
    upon an expiry of the guard timer, transmitting the failure information based on a second transmission path.

2. The wireless communication method of claim 1, further comprising:
    processing, by the user device, the first recovery operation or the second recovery operation.

3. The wireless communication method of claim 1, wherein the first transmission path is determined as via the second cell group, and wherein the method further comprises:
    upon occurrence of an on-going second cell group failure, transmitting the failure information based on the secondary cell in the first cell group.

4. The wireless communication method of claim 1, further comprising:
    initiating the first recovery operation or the second recovery operation; and
    reconfiguring, for a primary path configured for SRB1 (Signaling Radio Bearer 1) and set to a first logical channel linked with a primary cell in the first cell group, to a second logical channel linked with the secondary cell in the first cell group, or ignoring a cell restriction for the first logical channel.

5. The wireless communication method of claim 1, further comprising:
    initiating the first recovery operation or the second recovery operation; and
    sending a RA (Random Access) on a primary cell to request an uplink resource when no uplink grant is scheduled for the secondary cell in the first cell group and a maximum number of SR (Scheduling Request) has been reached.

6. The wireless communication method of claim 5, further comprising triggering an RRC reestablishment when a primary cell transmission is suspending.

7. The wireless communication method of claim 1, further comprising, after the transmitting of the failure information:
    stopping a PDCP (Packet Data Convergence Protocol) reordering function for SRB1; and
    ignoring downlink RRC messages received on SRB1 until the user device receives an RRC reconfiguration message including an indicator to indicate whether an RRC reconfiguration is associated with the first recovery operation and/or the second recovery operation.

8. The wireless communication method of claim 1, further comprising:
    after the transmitting of the failure information, stopping a PDCP (Packet Data Convergence Protocol) reordering function for SRB1; and
    starting the PDCP reordering function upon receiving an RRC reconfiguration message including an indicator to indicate whether an RRC reconfiguration is associated with the first recovery operation and/or the second recovery operation.

9. The wireless communication method of claim 1, further comprising:
    receiving an MN (Master Node) RRC reconfiguration message encapsulated in an SN (Secondary Node) RRC message; and
    sending an MN RRC reconfiguration complete message to a target MN via SRB1.

10. A communication apparatus comprising:
    a non-transitory computer-readable storage medium configured to store program code; and a processor configured to execute the program code stored on the computer-readable storage medium, the program code being configured to cause the processor to:
receive, from a network device, an indication indicating:
that both of a first recovery operation via a second cell group and a second recovery operation via a secondary cell in a first cell group are allowed for a first cell group failure, and
available transmission paths for the first recovery operation and the second recovery operation;
upon a detection of the first cell group failure, determine a first transmission path for transmitting failure information based on the received indication;
transmit the failure information based on the determining of the first transmission path;
start a guard timer; and
upon an expiry of the guard timer, transmit the failure information based on a second transmission path.

11. A non-transitory computer readable medium having code stored thereon program code executable by a processor that, when executed by the processor, is configured to cause the processor to:
receive, from a network device, an indication indicating:
that both of a first recovery operation via a second cell group and a second recovery operation via a secondary cell in a first cell group are allowed for a first cell group failure, and
available transmission paths for the first recovery operation and the second recovery operation;
upon a detection of the first cell group failure, determine a first transmission path for transmitting failure information based on the received indication;
transmit the failure information based on the determining of the first transmission path;
start a guard timer; and
upon an expiry of the guard timer, transmit the failure information based on a second transmission path.

12. The communication apparatus of claim 10, wherein the program code stored on the computer-readable storage medium is further configured to cause the processor to:
process the first recovery operation or the second recovery operation.

13. The communication apparatus of claim 10, wherein the first transmission path is determined as via the second cell group, and wherein the program code stored on the computer-readable storage medium is further configured to cause the processor to:
upon occurrence of an on-going second cell group failure, transmit the failure information based on the secondary cell in the first cell group.

14. The communication apparatus of claim 10, wherein the program code stored on the computer-readable storage medium is further configured to cause the processor to:
initiate the first recovery operation or the second recovery operation; and
reconfigure, for a primary path configured for SRB1 (Signaling Radio Bearer 1) and set to a first logical channel linked with a primary cell in the first cell group, to a second logical channel linked with the secondary cell in the first cell group, or ignore a cell restriction for the first logical channel.

15. The communication apparatus of claim 10, wherein the program code stored on the computer-readable storage medium is further configured to cause the processor to:
initiate the first recovery operation or the second recovery operation; and
send a RA (Random Access) on a primary cell to request an uplink resource when no uplink grant is scheduled for the secondary cell in the first cell group and a maximum number of SR (Scheduling Request) has been reached.

16. The communication apparatus of claim 15, wherein the program code stored on the computer-readable storage medium is further configured to cause the processor to:
trigger an RRC reestablishment when a primary cell transmission is suspending.

17. The communication apparatus of claim 10, wherein the program code stored on the computer-readable storage medium is further configured to cause the processor to:
after the transmitting of the failure information, stop a PDCP (Packet Data Convergence Protocol) reordering function for SRB1; and
ignore downlink RRC messages received on SRB1 until an RRC reconfiguration message is received, wherein the RRC reconfiguration message includes an indicator to indicate whether an RRC reconfiguration is associated with the first recovery operation and/or the second recovery operation.

18. The communication apparatus of claim 10, wherein the program code stored on the computer-readable storage medium is further configured to cause the processor to:
after the transmitting of the failure information, stop a PDCP (Packet Data Convergence Protocol) reordering function for SRB1; and
start the PDCP reordering function upon receiving an RRC reconfiguration message including an indicator to indicate whether an RRC reconfiguration is associated with the first recovery operation and/or the second recovery operation.

19. The communication apparatus of claim 10, further comprising:
receive an MN (Master Node) RRC reconfiguration message encapsulated in an SN (Secondary Node) RRC message; and
send an MN RRC reconfiguration complete message to a target MN via SRB1.

20. The computer readable medium of claim 11, wherein the program code stored on the computer readable medium is further configured to cause the processor to:
initiate the first recovery operation or the second recovery operation; and
send a RA (Random Access) on a primary cell to request an uplink resource when no uplink grant is scheduled for the secondary cell in the first cell group and a maximum number of SR (Scheduling Request) has been reached.

* * * * *